United States Patent [19]

Jadamus et al.

[11] Patent Number: 4,816,345

[45] Date of Patent: Mar. 28, 1989

[54] COMPONENT PARTS COMPRISED OF POLYPHENYLENE ETHERS AND ELASTOMERIC THERMOPLASTICALLY PROCESSIBLE STYRENE-CONTAINING BLOCK COPOLYMERS, AND PROCESS FOR PRODUCING THE SAME

[75] Inventors: Hans Jadamus; Klaus-Peter Richter, both of Marl, Fed. Rep. of Germany

[73] Assignee: Huls Aktiengesellschaft, Marl, Fed. Rep. of Germany

[21] Appl. No.: 10,728

[22] Filed: Feb. 4, 1987

[30] Foreign Application Priority Data

Feb. 28, 1986 [DE] Fed. Rep. of Germany ....... 3606473

[51] Int. Cl.$^4$ .............................................. B32B 27/32
[52] U.S. Cl. ..................................... 428/521; 428/519; 524/508; 525/133
[58] Field of Search ................ 428/521, 519; 524/508, 524/504; 525/133, 132

[56] References Cited

U.S. PATENT DOCUMENTS

| | | | |
|---|---|---|---|
| 3,380,878 | 4/1968 | Wheeler | 428/172 |
| 3,380,880 | 4/1968 | Wheeler | 428/411.1 |
| 3,383,435 | 5/1968 | Cizek | 525/132 |
| 4,169,186 | 9/1979 | Tazaki et al. | 428/406 |
| 4,332,858 | 6/1982 | Saitoh et al. | 428/412 |
| 4,588,764 | 5/1986 | Lee | 524/504 |
| 4,647,613 | 3/1987 | Jadamus et al. | 524/504 |
| 4,680,329 | 7/1987 | Brown et al. | 524/504 |
| 4,690,970 | 9/1987 | Feinauer et al. | 524/504 |

FOREIGN PATENT DOCUMENTS 2048903 12/1980 United Kingdom .

*Primary Examiner*—Edith Buffalow
*Attorney, Agent, or Firm*—Oblon, Fisher, Spivak, McClelland & Maier

[57] ABSTRACT

The invention relates to component parts comprised of at least two alternating layers comprising a polyphenylene ether-containing (PPE-containing) molded piece and an elastomeric thermoplastic block copolymer of the type A-B-A, wherewith A represents a styrene block and B a soft phase block; and a method of manufacturing the same.

6 Claims, No Drawings

COMPONENT PARTS COMPRISED OF POLYPHENYLENE ETHERS AND ELASTOMERIC THERMOPLASTICALLY PROCESSIBLE STYRENE-CONTAINING BLOCK COPOLYMERS, AND PROCESS FOR PRODUCING THE SAME

BACKGROUND OF THE INVENTION

1. Field of the Invention:

The invention relates to component parts comprised of hard and elastomeric segments, in which the segments are rigidly bound together. The parts are manufactured by thermoplastic forming operations, using polyphenylene ethers (PPEs) and styrene-containing block copolymers.

2. Discussion of the Background:

Often a single material cannot contribute all the properties desired for an object. Such incompatible combinations of properties are, for example, high strength and stiffness combined with rubberlike elasticity and traction.

In order to invest component parts with properties not attainable in a single material, the parts are constructed as combinations of pieces comprised of different materials. In order for such parts to function satisfactorily, the pieces must be bonded together strongly and durably.

For objects comprised of thermoplastics and rubber, the bonding is ordinarily achieved by mechanical fastening, adhesive bonding, or covulcanization with the use of agents which serve as special covulcanization aids.

The strength of the bonding achieved by mechanical means is sufficient only for low stress applications.

In relatively large scale serial production, adhesive bonding is costly. In many cases, when an adhesive agent is used additional material related problems are introduced.

The most effective technique heretofore has been covulcanization of the stiff molded material and the rubber composition. This necessitates pretreatment of the surface of the stiff molded material and/or special treatment of the rubber composition.

One technique for surface-treating the thermoplastic consists of spreading an aqueous solution of vinylpyridine latex, resorcinol, and formaldehyde on the thermoplastic (See Nitzsche, L. H., *Kautschuk and Gummi, Kunststoffe* 36:572-6 (1983) and the 1972 monograph "Keilriemen" issued by Arntz-Optibelt-Gruppe Hoexter, published by Verlag Ernst Heyer, Essen, FRG, page 83). According to another method, the thermoplastic surface is treated with a gasoline solution of isocyanates ("Bayer-Taschenbuch fur die Gummi-Industrie", page 254 (1963)). Also, the rubber composition may have adhesion-promoting additives incorporated in it, for example, combinations of resorcinol, formaldehyde sources, silicic acid, zinc oxide, and fatty acids (Kleeman, W., "Mischungen fur die Elastverarbeitung", Leipzig, p. 300 (1982)).

There are a number of known binder systems comprising PPE-containing plastics and crosslinked rubbers. However, bonding is not achievable by thermoplastic processing in any of these systems.

Thus, in German OS No. 31 35 851, laminated bodies are described which are comprised of a natural or synthetic rubber and a partially crosslinked plastic.

It is known that SBR and EPR rubbers and polybutadienes display unexpectedly high adhesion to certain plastics after relatively long thermal treatment. These plastics, characterized by recurring p-oxyphenylene units, include poly(2,6-dimethyl-1,4-phenylene ether), polysulfones, and polycarbonates (Dreyfuss, P. and Runge, M. L., *J. Appl. Polym. Sci.* 23 (1979), 1863-66).

The processing conditions for these compounds correspond to those of vulcanization, i.e., curatives such as, e.g., peroxides and sulfur are necessary, and processing times are much greater than for thermoplastic processing methods.

German patent application No. P 36 02 705.7 of Jan. 30, 1986, which claims internal priority to German patent application No. P 35 07 506.6 of Mar. 4, 1985, describes a "method of producing a chemical bonding between PPE-based molding compositions and double-bond-containing sulfur-vulcanizable rubbers". Additionally, the rubbers used here are not subject to further thermoplastic processing.

German OS No. 27 18 481 (abandoned) asserts general claims for a three-layered bonded film strip comprised of two outer thermoplastic plastic layers and an inner, rubber-containing elastomer layer. However, what is disclosed is merely a film comprised of polyethylene as an outer layer and butyl rubber as an inner layer. The film can be manufactured by applying the rubbers in porous form onto a thermoplastic film, and then evaporating the solvent or coextruding the two materials. One skilled in the art is not able to infer from this publication any concrete teaching relating to bonding of other thermoplastic materials to elastomers.

A laminated material comprised of at least one PPE-containing layer A and at least one layer B containing at least 40 wt. % styrene is described in German OS No. 21 16 558. The styrene-containing layer may be comprised entirely of homopolystyrene; copolymers with up to 60 wt. % "hard comonomers" such as acrylonitrile, (meth)acrylic acid esters, or maleic anhydride; or 3-30 wt. % high impact polystyrene. A special embodiment in which pure isotactic polystyrene is used as the styrene polymer, or else a mixture of isotactic and atactic polystyrene is so used, is the subject of German OS No. 28 09 980 (abandoned). The laminated materials in both cases are quite intentionally limited to a combination of two hard plastic components. Therefore the proportion of styrene in layer B is always greater than 40 wt. %.

SUMMARY OF THE INVENTION

Accordingly, one object of the present invention is to provide component parts comprised of PPE-containing molded pieces and elastomeric thermoplastics which combine the properties of both substances in a single material.

Another object of the invention is to provide component parts comprised of PPE-containing molded pieces and elastomeric thermoplastics which are thermoplastically processible.

These objects and other objects of the present invention which will become apparent from the following specification have been achieved by the component parts of the present invention which comprise a component part having at least two alternating layers, comprising, a polyphenylene ether-containing molded piece and an elastomeric thermoplastic, wherein (a) said molded piece contains polystyrene or a high-impact polystyrene, and the amount of said polyphenylene ether is equal to or greater than the amount of said polystyrene, or (b) said molded piece contains no polystyrene, and the weight of said polyphenylene ether is at least 20 wt. % of said molded piece, and wherein said elastomeric thermoplastic is a block copolymer of the type A-B-A, wherein A is a styrene block and B is a soft phase block, and wherein said soft phase block is at least 60 wt. % of said elastomeric thermoplastic.

DETAILED DESCRIPTION OF THE PREFERRED EMBODIMENTS

It is of particular significance that, in the present invention, good adhesive bonding is observed not only with pure PPEs but also with industrially important mixtures of PPEs with styrene polymers in which the PPE components predominate.

Thus far there is no satisfactory explanation for the good adhesive bonding. One must assume that the type of bonding in the present case is different from that which occurs in covulcanization. This is because in the present invention there is no change in the adhesive bonding when the styrene proportion is increased, whereas with covulcanization the bonding sharply deteriorates with increased styrene.

The inventive component parts, generally in the form of laminated structures, preferably comprise two or three alternating layers of a PPE-containing molded piece and an elastomeric thermoplastic. Of course, there may be four or more layers, if desired. Also of interest are sytems in which the plastic (or the thermoplastic) is laminated with the second component material only at specific locations. For example, a mat having small rubber feet at regular intervals.

The PPE-containing molded pieces may contain, in particular, polystyrene and high impact polystyrene. The amount of PPEs should be at least as great as the amount of all styrene polymers.

If the molded pieces contain no polystyrene, the amount of PPEs should be at least 20 wt. % of the weight of the molded piece.

The molded pieces may additionally contain rubbers, polyoctenylenes, polyethylenes, polyamides, compatibility-promoting agents, and other additives such as glass fibers, etc.

Particularly preferred are:

(a) The molded pieces obtained according to German patent application No. P 34 24 219.8 of June 30, 1984, which are based on PPE, high impact styrene polymers, and pulverulent, filler-containing rubber;

(b) The molded pieces obtained according to German patent application No. P 35 18 277.6 of May 22, 1985, which are based on PPE and polyoctenylenes;

(c) The molded pieces obtained according to German patent application No. P 34 42 274.9 of Nov. 20, 1984, which are based on PPE and styrene/butadiene emulsion polymerization products;

(d) The molded pieces obtained according to German patent application No. P 34 42 273.0 of Nov. 20, 1984, which are based on PPE, styrene polymers, and polyoctenylenes.

The method of preparing the PPE-containing molded pieces, where not otherwise indicated herein, is a known method cited in the literature.

The elastomeric thermoplastic is a styrene-containing block copolymer of type A-B-A with 20-40 wt. % preferably 25-35 wt. % styrene as block A. Block B is a soft phase comprised primarily of polymerized butadiene units or polyisoprene units.

The copolymers may be linear or branched. Their molecular weight is preferably 80,000 to 120,000 if they are linear; 100,000 to 300,000 if they are branched.

Preferred copolymers have their soft phase hydrogenated. Particularly preferred are copolymers obtained by hydrogenating copolymers with a soft phase comprised of 40-50% poly(1,2-butadiene) and of 60-50% poly(1,3-butadiene). Corresponding block copolymers are designated "styrene/ethylene/butylene/styrene block copolymers".

As a rule the copolymers are not used alone, but are rather compounded with the usual additives, e.g., antioxidants, UV stabilizers, mineral oils (preferably aromatic-free), and pigments.

The fabrication of the component parts comprised of hard and elastomeric segments can be carried out in one or two stages.

One-stage methods for preparing bonded systems between hard and elastomeric segments are known for other combinations of materials, under the names "coextrusion", "one-stage two-color injection molding", and "two-component injection molding".

In the two-stage method, a prefabricated segment comprised of the hard thermoplastic is compressed with the elastomeric thermoplastic, e.g., pressed together by injection molding, or by extrusion. In the process, the elastomeric thermoplastic is heated to a least the temperature required for hot forming. Suitable temperatures lie between 180° and 300° C., preferably between 220° and 260° C.

The inventive component parts may be in the form of laminated bodies, films, laminated belts or strips, mats with insert-outsert technique, etc. They may find numerous kinds of applications as parts of fittings, as gaskets or gasket elements, as housings, as fittings for pipe and tubing, as flanges, as shock absorbing parts (e.g., lateral parts of motor vehicles), shoe heels, etc. Other interesting application possibilities are in the area of laminated elastomeric rollers and the like.

Other features of the invention will become apparent during the course of the following description of exemplary embodiments which are given for illustration of the invention and are not intended to be limiting thereof.

EXAMPLES

Hard Thermoplastics

Material 1

A polymer mixture according to German OS No. 35 18 277, comprised of:

Poly(2,6-dimethyl-1,4-phenylene ether) with a J-value of 49 ml/g (100 parts by weight); and Vestenamer ® 8012 (10 parts by weight). Vestenamer 8012 is a polyoctenylene with a J-value of 120 ml/g and a trans-content of 80%. Such a product is commercially available (manufacturer: HÜLS AG, D-4370 Marl 1 FRG).

Material 2

Vestyron ® 114, a styrene homopolymer (supplied by Huels AG, D-4370 Marl, F.R.G.). The characteristic parameters of the Vestyron ® products may be found in the brochure, "Kunststoffe von Huels, Vestyron ®", Edition of September 1983.

Material 3

Vestyron ® 616, a modified, high impact styrene polymer (supplied by Huels AG).

Elastomeric Thermoplastics

Material 4

Kraton ® G-1651, a styrene/ethylene/butylene/styrene block copolymer (supplied by Shell AG), having 30 wt. % styrene component.

Material 5

Cariflex ® TR 1102, a styrene/butadiene/styrene block copolymer (supplied by Shell AG), having 30 wt. % styrene component.

The properties and characteristics of these products may be found in leaflets supplied by the manufacturers.

Bonding

Bonded plates were produced in the following manner:

Plates comprised of the hard thermoplastics, 2 mm thick, were coated with the elastomer materials in granule form, and were pressed at 200° C. for 5 min., resulting in bonded plates 4 mm thick.

TABLE

| | Results of separation test (DIN 53 531) at 23° C. | | |
|---|---|---|---|
| Example No. | Hard component (thermoplastic) | Elastomer (thermoplastic) | Separation force (N/mm) |
| A | Material 1 | Material 5 | 6.0 |
| B | Material 1 | Material 4 | 6.5 |
| C | 60 wt. % Material 1 40 wt. % Material 2 | Material 4 | 5.8 |
| D | 60 wt. % Material 1 40 wt. % Material 3 | Material 4 | 6.1 |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A component part comprised of at least two rigidly bonded alternating layers, comprising:
   a polyphenylene ether-containing molded piece and an elastomeric thermoplastic, wherein
   (a) said molded piece contains polystyrene or high-impact polystyrene, and the amount of said polyphenylene ether is equal to or greater than the amount of said polystyrene, or
   (b) said molded piece contains no polystyrene, and the weight of said polyphenylene ether is at least 20 wt. % of said molded piece, and
   wherein said elastomeric thermoplastic is a styrene/butadiene/styrene block copolymer comprising 20–40 wt. % styrene, or a partially hydrogenated derivative thereof.

2. The component part of claim 1, wherein said molded piece further comprises at least one additive selected from the group consisting of rubbers, polyoctenylenes, polyethylenes, polyamides, compatibility-promoting agents and glass fibers.

3. The component part of claim 2, wherein said additive comprises $\leq 20$ wt. % rubbers and polyoctenylenes.

4. The component part of claim 1, wherein said block copolymer further comprises at least one additive selected from the group consisting of antioxidants, UV stabilizers, mineral oils, and pigments.

5. The component part of claim 1, wherein said block copolymer is linear and has a molecular weight of about 80,000 to 120,000.

6. The component part of claim 1, wherein said block copolymer is branched and has a molecular weight of about 100,000 to 300,000.

* * * * *